United States Patent Office 3,359,286
Patented Dec. 19, 1967

3,359,286
PREPARATION OF 1-AMINO-4-(3'-THIOSULFATO-ETHYLSULFONYL - ANILINO) - ANTHRAQUI-NONE-2-SULFONIC ACID
Fritz Meininger and Ernst Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Nov. 2, 1964, Ser. No. 408,318
Claims priority, application Germany, Nov. 7, 1963, F 41,209
1 Claim. (Cl. 260—374)

The present invention provides a new, valuable anthraquinone dyestuff of the formula

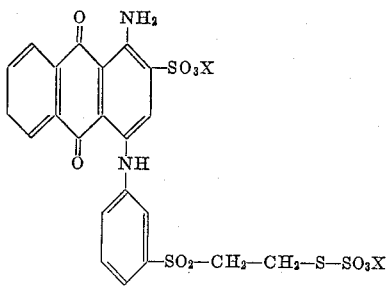

wherein X represents a hydrogen atom or an alkali metal atom.

It has been found that a valuable anthraquinone dyestuff of the formula

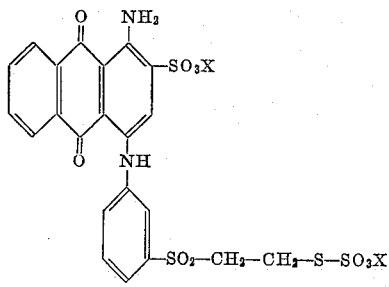

wherein X represents a hydrogen atom or an alkali metal atom, can be prepared by reacting the dyestuff of the formula

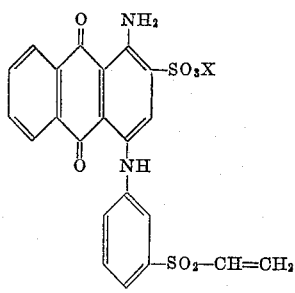

wherein X has the meaning given above, in an aqueous medium at pH-values between 3 and 8.5 with salts of thiosulfuric acid.

As salts of thiosulfuric acid there enter into consideration alkali metal salts and alkaline earth metal salts, in particular sodium thiosulfate, either containing crystal water or in anhydrous form.

It is advantageous to carry out the process of the present invention in such a way that a salt of thiosulfuric acid is added to an aqueous solution or suspension of the vinylsulfonyl dyestuff used as starting product, and, since hydrogen ions are consumed during the reaction, the pH-value of the reaction mixture, which is between 3 and 8.5, is maintained by portionwise adding an acid. As acids for adjusting the pH-value organic acids can be used, for example formic acid and acetic acid, or inorganic acids, for example phosphoric acid, hydrochloric acid or sulfuric acid.

It is also possible to add the necessary quantity of a weak acid, which may be buffered by one of its alkali metal salts, to a neutral aqueous solution or suspension of the starting dyestuff and to add the thiosulfate subsequently in portions.

Another modification of the process of the invention is that a solution of a salt of thiosulfuric acid and an acid are simultaneously introduced into the aqueous solution or suspension of the starting dyestuff while maintaining the pH-value.

The reaction temperature can be varied in wide limits, normally, the reaction is carried out at temperatures between 10° C. and 100° C.

The dyestuff obtained according to the process of the present invention is more easily soluble in water than the starting dyestuff. After the completion of the reaction it is precipitated by means of inorganic salts, for example sodium chloride or potassium chloride and isolated by filtration. The new dyestuff can be used for dyeing and printing materials of cellulose, for example, cotton, linen or viscose rayon. It is also suitable for dyeing and printing nitrogen-containing fibers of animal or synthetic origin, for example wool, silk, polyamide fibers or polyurethane fibers.

A dyeing can be obtained on a cotton fabric by impregnating the fabric with a solution of the dyestuff, which contains an agent having an alkaline reaction and an alkali metal salt of a strong mineral acid, leaving the fabric for some time at room temperature and neutralizing and rinsing it in usual manner. Dyeings on wool are obtained, for example, in a weakly acid or neutral bath.

The dyeings obtained are distinguished by a clear blue tint and a good fastness to light and wet processing The following examples serve to illustrate the invention, but they are not intended to limit it thereto, the parts being by weight unless otherwise stated, and the relationship of parts by weight to parts by volume being the same as that of the kilogram to the liter.

*Example 1*

484 parts of the vinylsulfonyl dyestuff of the formula

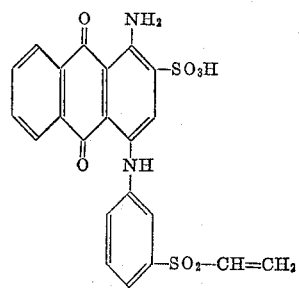

(German Patent No. 960,534) are introduced into 18,000 parts by volume of water and heated to 50° C.–55° C. The pH-value is adjusted to 5.2–5.7, 375 parts of sodium thiosulfate containing crystal water are then added, and the above-mentioned pH-value is maintained at 50° C.–55° C. until the completion of the reaction by dropwise adding about 290 parts by volume of acetic acid of 50% strength. The duration of the reaction is about 4 hours. The dyestuff solution obtained is clarified while hot, and the dyestuff is precipitated from the filtrate, which was cooled to 18° C.–22° C., by the addition of 200 parts of sodium chloride. It is filtered with suction, dried at 60° C. and ground.

There are obtained 880 parts of a blue powder which is readily soluble in water and which contains 562 parts of the dyestuff of the formula

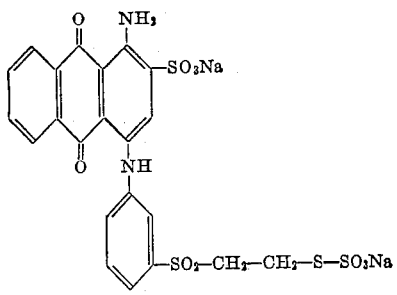

If instead of sodium chloride potassium chloride is used for salting out the dyestuff, the corresponding dipotassium salt of the dyestuff is obtained.

Example 2

484 parts of the vinylsulfonyl dyestuff, indicated in Example 1, are stirred in 18,000 parts by volume of water and heated to 70° C.–75° C. The pH-value is adjusted to 5.7–6.2, 375 parts of sodium thiosulfate containing crystal water are introduced, and the above-mentioned pH-value is maintained at 70° C.–75° C. until the completion of the reaction by dropwise adding about 230 parts by volume of acetic acid of 50% strength. The duration of the reaction is about 3 hours. The dystuff solution obtained is worked up as described in Example 1. There are obtained 690 parts of a blue powder which is readily soluble in water and which contains 577 parts of the dyestuff decribed in Example 1.

Example 3

484 parts of the vinylsulfonyl dyestuff, indicated in Example 1, are stirred in 17,000 parts by volume of water and heated to 50° C.–55° C. At this temperature 350 parts by volume of acetic acid of 50% strength are added (pH-value=3.5–4.0) and a solution of 400 parts of sodium thiosulfate containing crystal water in 1000 parts by volume of water are dropwise added thereto in the course of 4–5 hours. Stirring is continued at 50° C.–55° C. until the reaction is complete, and the reaction product is worked up as described in Example 1. There are obtained 720 parts of a blue powder which is readily soluble in water and which contains 565 parts of the dyestuff described in Example 1.

Example 4

484 parts of the vinylsulfonyl dyestuff, indicated in Example 1, are introduced into 18,000 parts by volume of water and heated to 50° C.–55° C. The pH-value is adjusted to 5.2–5.7, 375 parts of sodium thiosulfate containing crystal water are then added, and the above-mentioned pH-value is maintained at 50° C.–55° C. until the completion of the reaction by dropwise adding about 1,250 parts by volume of 2 N-hydrochloric acid. The duration of the reaction is about 6 hours. The dyestuff solution is worked up as described in Example 1. There are obtained 710 parts of a blue powder which is readily soluble in water and which contains 560 parts of the dyestuff described in Example 1.

Example 5

484 parts of the vinylsulfonyl dyestuff, indicated in Example 1, are introduced into 16,000 parts by volume of water and heated to 50° C.–55° C. After the pH-value has been adjusted to 8–8.5, 375 parts of sodium thiosulfate containing crystal water are added. During the reaction period of about 9 hours the pH-value is maintained between 8 and 8.5 at 50° C.–55° C. by dropwise adding about 200 parts by volume of acetic acid of 50% strength. The dyestuff solution obtained is worked up as described in Example 1. There are obtained 670 parts of a blue powder which is readily soluble in water and which contains 545 parts of the dyestuff described in Example 1.

We claim:

1. Process for preparing an anthraquinone dyestuff of the formula

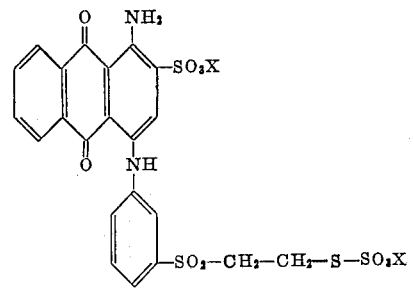

in which X represents a member selected from the group consisting of hydrogen, sodium and potassium, which comprises reacting the dyestuff of the formula

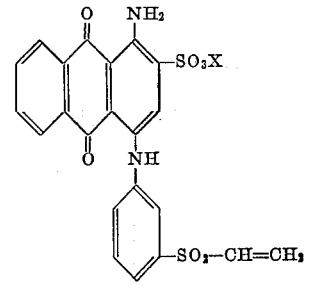

in which X has the meaning given above, in an aqueous medium at an acid pH-value from 3 to below 7 with a salt of thiosulfuric acid.

References Cited

UNITED STATES PATENTS 3,102,894  9/1963  Lodge _____ 260—374

OTHER REFERENCES

Caldwell et al.: Textile Research Journal, vol. 33, pp. 481–487 (June 1963).

Stahmann et al.: J. Org. Chem., vol. 11, Baltimore: The Williams & Wilkins Co., pp. 719–735 (pp. 719–22 and 730–735 relied upon) (1946).

Virnik et al.: Chemical Abstracts, vol. 57, pp. 2449(f)–2450(a) (1962).

LORRAINE A. WEINBERGER, *Primary Examiner.*

R. K. JACKSON, *Examiner.*

H. C. WEGNER, *Assistant Examiner.*